Dec. 14, 1948.   W. THORPE   2,456,226
INFORMATION POSTING BOARD
Filed April 18, 1947   5 Sheets-Sheet 1
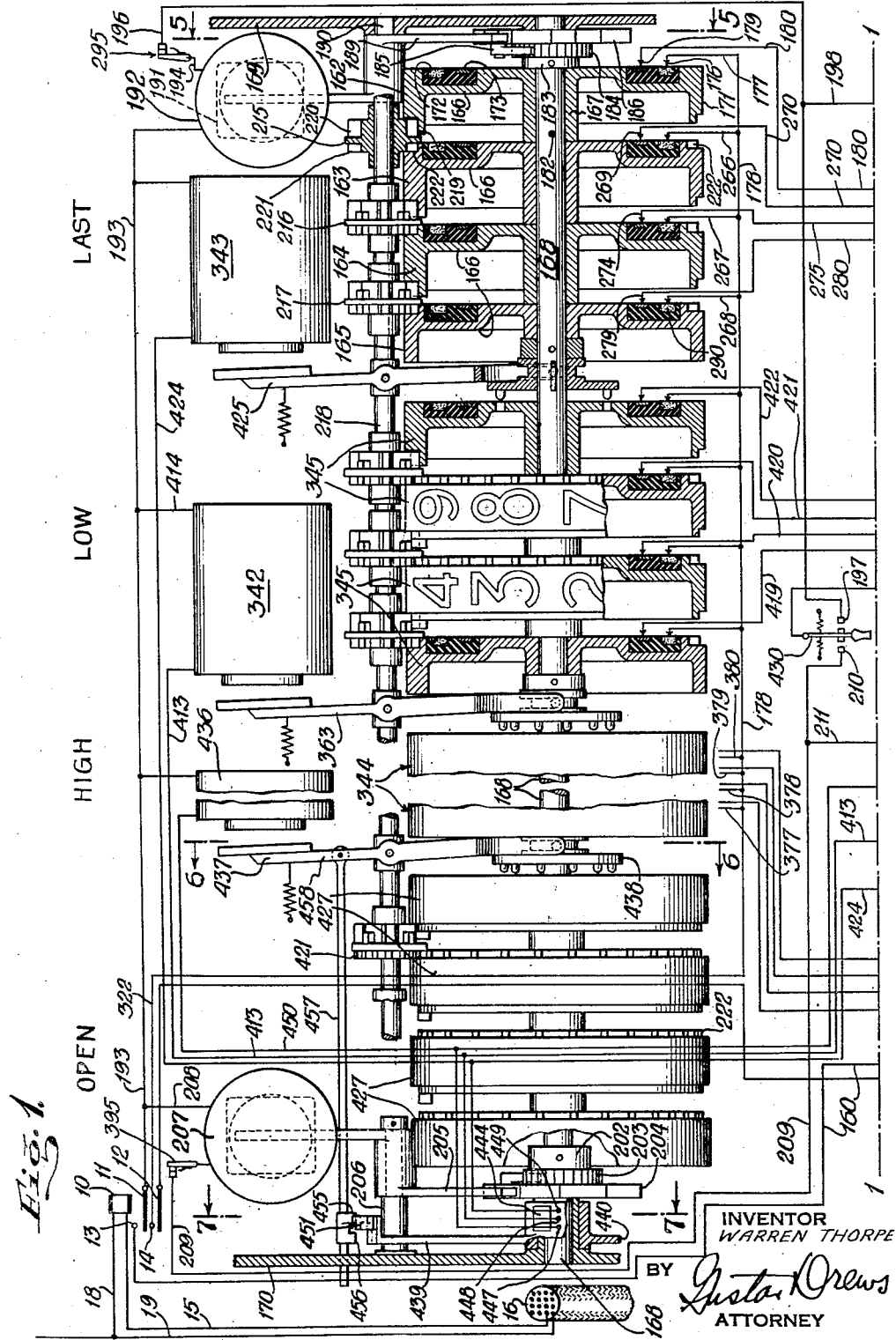

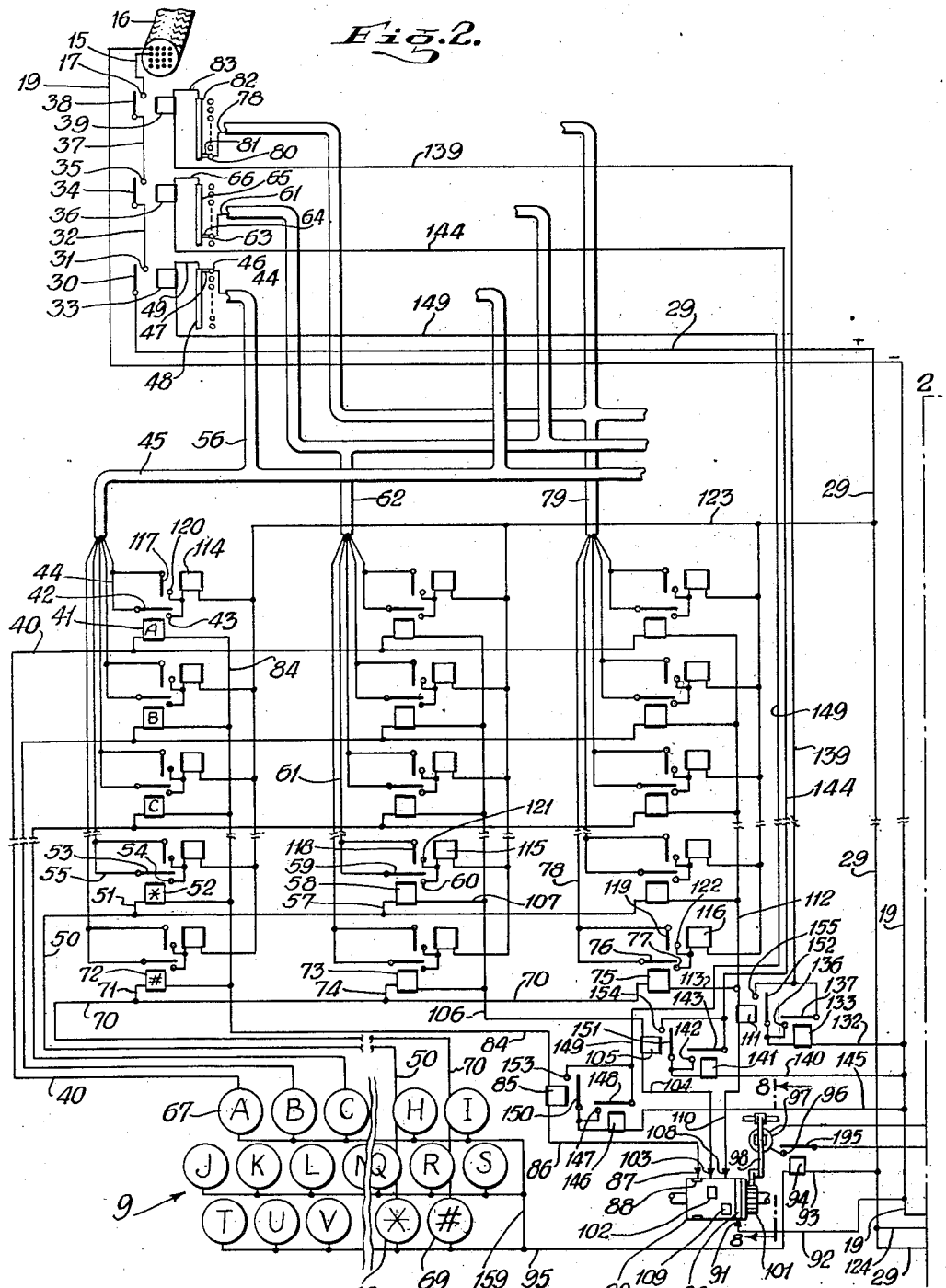

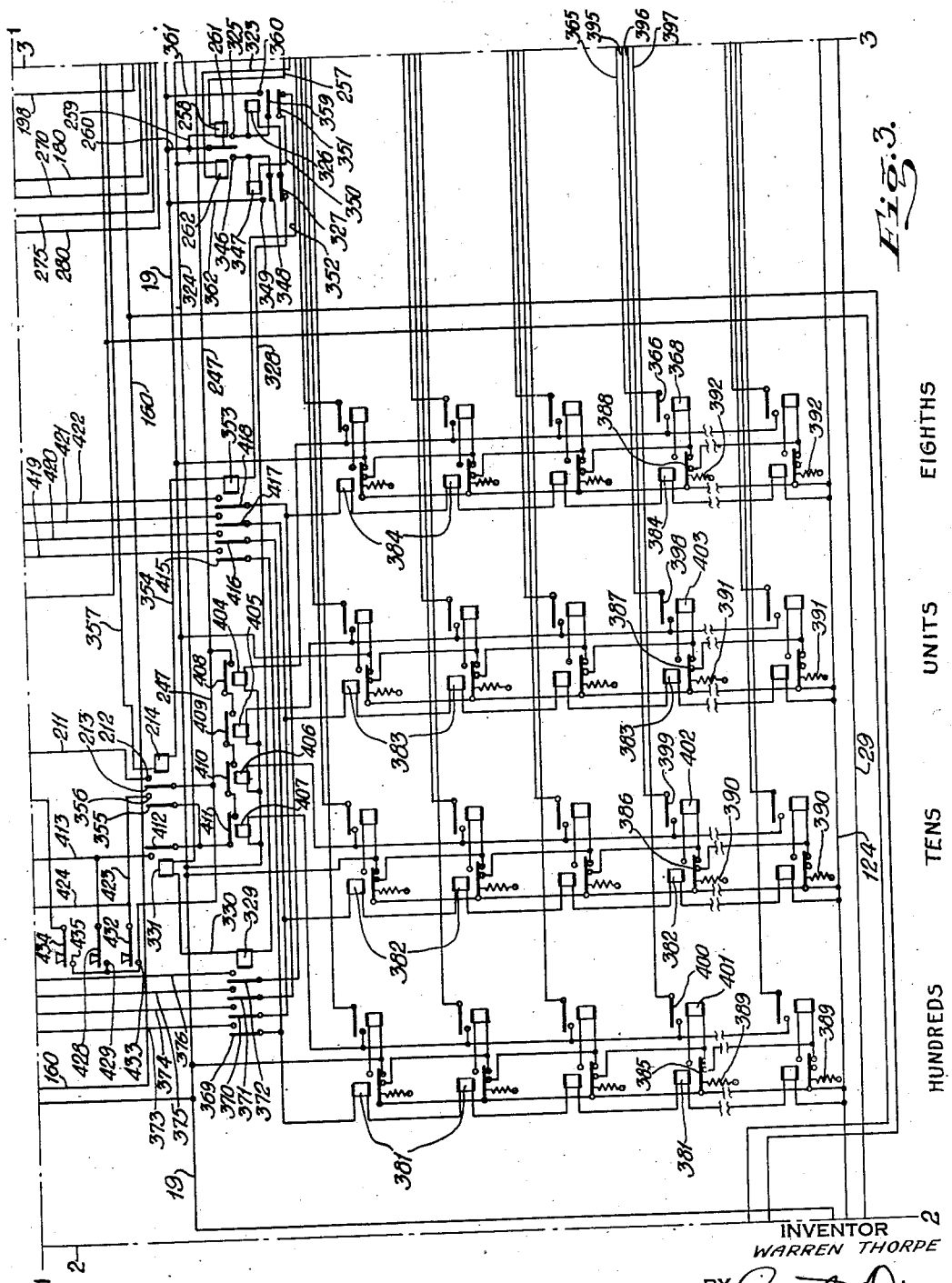

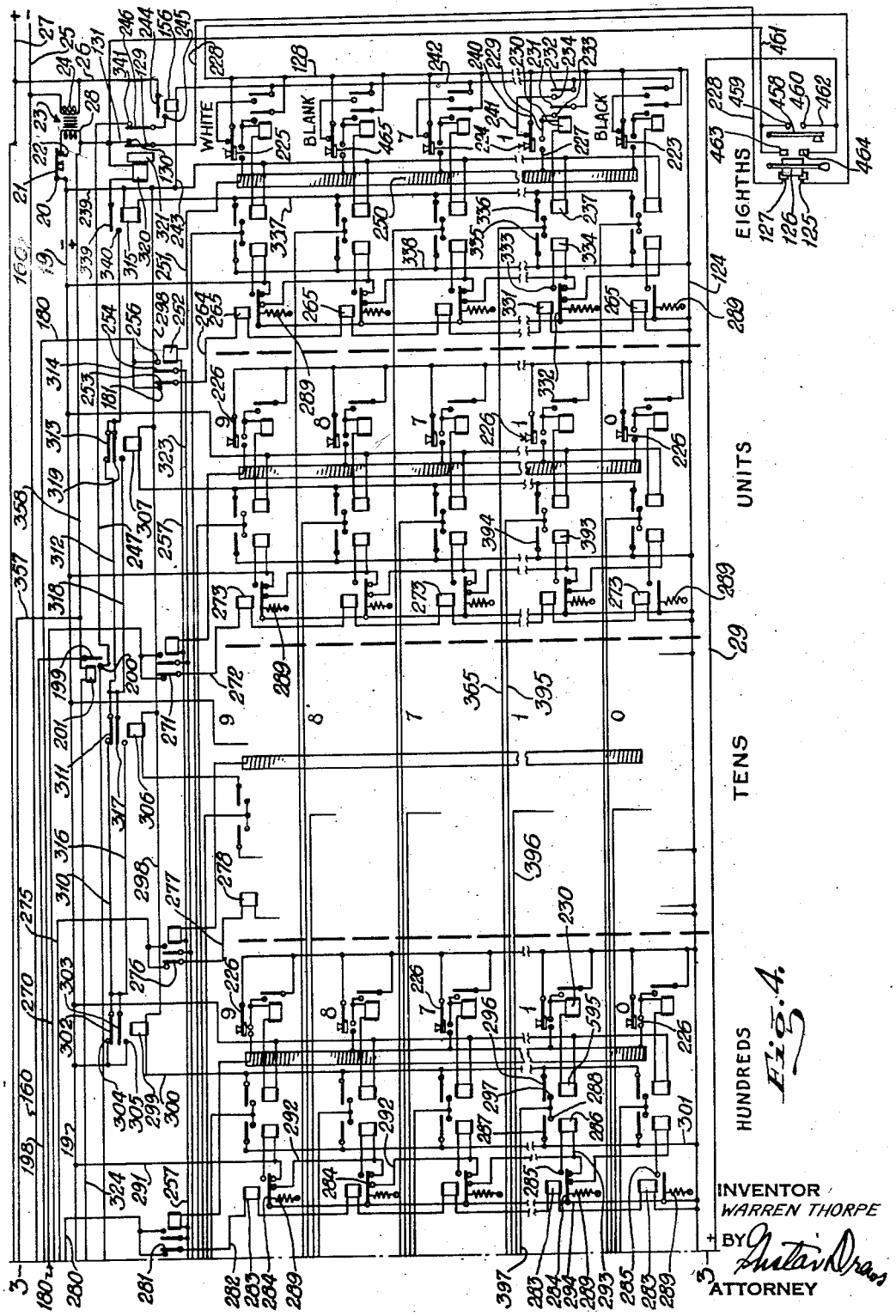

Dec. 14, 1948.  W. THORPE  2,456,226
INFORMATION POSTING BOARD
Filed April 18, 1947  5 Sheets-Sheet 5
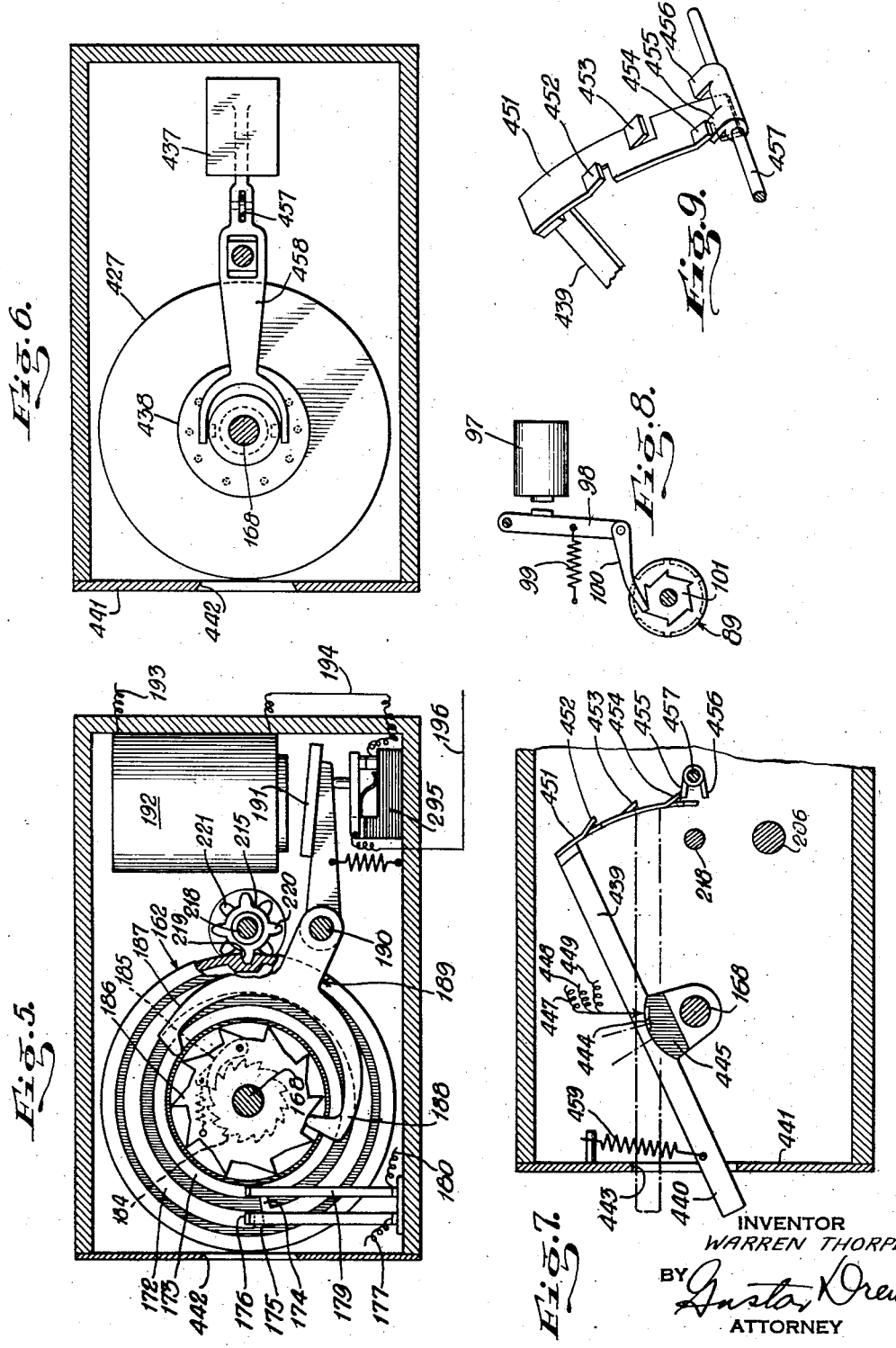

Patented Dec. 14, 1948

2,456,226

UNITED STATES PATENT OFFICE 2,456,226

INFORMATION POSTING BOARD

Warren Thorpe, New York, N. Y.

Application April 18, 1947, Serial No. 742,341

11 Claims. (Cl. 177—353)

This invention relates to information posting boards in general, and more especially to information posting boards for posting the quotations of business transactions.

Among the objects of the present invention, it is aimed to provide an improved information posting board or machine, whereby an attendant can quickly post or report changing records of a large number of items, so that if the board is being used for posting the quotations of a stock market, the constantly changing quotations of a large number of stocks can be quickly recorded and posted, in turn so that if the board is being used for posting the arrival and departure of successive trains, buses or aircraft at a station, these arrivals and departures can be quickly recorded and posted, in turn if the machine is being used for recording the returns of an election, the constantly changing returns as they are received can be quickly recorded and posted either separately or in totals, in turn if the board is being used for recording the amount of bets as they are received on a parimutuel machine, the consequently increasing totals can be quickly recorded and posted, and in turn if the board is being used for any purpose requiring a range of varying figures or continuing totals to be shown, the same can be quickly recorded and posted.

It is still another object of the present invention to provide an improved record posting machine such as disclosed in my co-pending application for patent, Ser. No. 635,966, filed December 19, 1945, now U. S. Patent No. 2,436,836 granted March 2, 1948, particularly adapted for posting the changing quotations of a stock market whereby one and the same attendant can immediately post not only the last quotation of a large number of stocks, but whereby the high quotation and low quotation of a particular trading period or trading day will automatically be posted whenever the last quotation is the high or low of the day, and whereby at the end of a particular trading period or trading day, or before the beginning of a new trading period or trading day, the machine can with facility be set for predetermined whole numbers, thereupon means actuated automatically to record or post the opening quotation as the first quotation of any stock being posted, and thereupon leave the opening quotation so posted in display position for the remainder of a trading period or trading day while the means for posting the high, low and last quotations of such stock are being operated during the remainder of the trading period or trading day without thereafter changing or affecting the price displayed by the opening quotation posting means.

These and other features, capabilities and advantages of the invention will appear from the subjoined detail description of one specific embodiment thereof illustrated in the accompanying drawings, in which:

Fig. 1 is a front elevation partly in section associated with a part of the wiring diagram showing a set of record posting wheels for a single item, such as a stock.

Fig. 2 is a fragmental plan view of the item or stock selecting key board and a part of the wiring diagram associated therewith.

Fig. 3 is a part of the diagram continuing to the right of the line 2—2 of Fig. 2, and below the line 1—1 of Fig. 1.

Fig. 4 is a part of the diagram continuing to the right of the line 3—3 of Fig. 3.

Fig. 5 is a section on the line 5—5 of Fig. 1.

Fig. 6 is a section on the line 6—6 of Fig. 1.

Fig. 7 is a fragmental section on the line 7—7 of Fig. 1.

Fig. 8 is a detail on the line 8—8 of Fig. 2.

Fig. 9 is a detail in perspective of the switch shown in Fig. 7.

The information posting machine constituting the main part of this invention may in part be used for posting the returns of an election, the arrivals, departures and records of airplane flights, the quotations of a stock market, or the betting totals or records of a parimutuel machine and for other similar purposes. The specific embodiment here illustrated is particularly adapted for posting and recording the quotations of a stock market, such as the "open," "high," "low" and "last," referring to the opening quotation, highest quotation, lowest quotation, and last or current quotation of a particular trading period or trading day. These designations "open," "high," "low" and "last" are extensively used in brokers' offices throughout the United States.

The present machine consists essentially of a posting or quotation board divided into a number of areas depending upon the number of stocks to be reported by means of this board. It is quite common with these boards when used for posting stock quotations to provide areas for at least one hundred and fifty stocks. It is believed practical with the present board to provide areas for as many different stocks as are required, whether one hundred and fifty stocks, more or less.

The machine, for the purpose of description, may be conveniently divided into several topics more or less arbitrarily chosen, to wit, the stock selector, the mechanism for setting the last quotation, the mechanism for setting either the high or low quotation, the mechanism for setting the board before the opening of a trading day to enable recording the opening quotation, and miscellaneous mechanisms, such as the mechanism for affecting corrections.

Briefly, the machine will include a letter or alphabetical keyboard device, such as the keyboard 9, which will be operated to select the stock for which the quotation is to be posted.

In addition the machine also has a second keyboard consisting of numerals and indices for posting the prices, which keys are common to all of the stocks and will be operated only after the stock has been selected. Some of these keys are illustrated in Fig. 4 and will hereinafter be described in detail.

According to the mechanism hereinafter to be described with the first quotation, all of the number wheels of the particular stock, see Fig. 1, will be set to post the first quotation for each stock, to wit, below each of the words "open," "high," "low" and "last." Thereupon, if for this stock the next quotation is lower than the opening quotation, only the number wheels under the words "low" and "last" will change. If thereupon the third quotation of the day is higher than the opening quotation, then only the number wheels under the words "high" and "last" will be actuated to record this high quotation. With this mechanism the number wheels under the word "last" will be operated with each succeeding quotation, if it differs from a previous quotation. The number wheels under the word "open" will not change after the initial quotation for a particular trading period or trading day. The number wheels under the word "low" will only change when a quotation is to be recorded that is lower than any previously recorded quotation and the number wheels under the word "high" will only be operated when the current quotation is higher than any previously recorded quotation, for a particular trading period.

In the interest of clarity, the several main parts of the mechanism will now be described in the order heretofore named.

*Stock selector*

The wiring diagram illustrated in Figs. 1 and 2 diagrammatically shows the hookup between the keyboard 9 and the stock selected. Assuming that the sets of number wheels in the area of a stock board under the notations "open," "high," "low" and "last" illustrated in Fig. 1 are connected as hereinafter to be described, to post or record the quotations of the stock Anaconda Copper, the symbol for which is "A," then the magnet 10 is operatively connected by wires, when the combination responsive to the keys associated with the letter "A," symbol "*" and symbol "#" are actuated, that is, when the "A" key, "*" and "#" key of the keyboard 9 are depressed. When this magnet 10 is so energized, it will actuate the two switch arms 11 and 12 to engage the contacts 13 and 14, respectively, the magnet 10 being connected by the conductor 15 through the cable 16 with the contact 17, and being connected by the conductor 18 with the conductor 19 which is connected to the contact 20 of the manually operated switch arm 21 which normally engages the contact 22 of one of the windings 23 of the transformer 23. The other winding 24 of the transformer 23 is connected to one of the main leads 25 and to the conductor 26 which is connected to the other main lead 27. The winding 28 connected to the contact 22 is connected by conducting means, hereinafter to be described, to the conductor 29 which is connected to the switch arm 30 which may be brought into contact with the contact 31 of the conductor 32 by the electromagnet 33 and the conductor 32 is connected to the switch arm 34 which may be brought into contact with the contact 35 by the magnet 36, and the contact 35 is in turn connected by the conductor 37 with the switch arm 38 which may be brought into contact with the contact 17 of the conductor 15 by the magnet 39. These electromagnets 33, 36 and 39 in turn are energized when the "A" key 67, the "*" key 68, and the "#" key 69, respectively, are depressed and in the succession named. The key 67 is connected by the conductor 40 to the magnet 41 which when energized brings the switch arm 42 into engagement with the contact 43. The switch arm 42, in turn, is connected to the conductor 44 which extends through the cable 45 and the conductor 56 to the contact 46 which is connected by the movable contact 47 with the bar 48 which is connected by the conductor 49 with the magnet 33. The key 68 in turn is connected by the conductor 50 with the conductor 51 which is connected to the magnet 52 which when energized actuates the switch arm 53 into engagement with the contact 54, the switch arm 53 being in turn connected by the conductor 55 through the cable 45. However, since the conductor 55 through the cable 45 and its branch 56 is not in communication with the bar 48 by means of the movable contact 47, it will have no effect on the magnet 33. On the other hand, since the conductor 59 is also connected by the conductor 57 to the magnet 58, when it is energized it will attract the switch arm 59 to engage the contact 60 when the current will flow through the conductor 61 which after passing through the cable 62 engages the contact 63 and by means of the movable contact 64 engages the bar 65, which is connected by the conductor 66 to the magnet 36, whereupon the magnet 36 will be energized to attract the switch arm 34 to engage the contact 35. In turn, when the key 69 is depressed, the current will flow through the conductor 70 which is connected not only by the conductor 71 to the magnet 72, but also to the magnet 73 by the conductor 74, and the conductor 70 is also connected to the magnet 75. When the magnet 75 is energized it will attract the switch arm 76 to engage the contact 77 and complete a circuit through the conductor 78 which after passing through the cable 79 is connected to the contact 80 which is connected by the movable contact 81 to the bar 82 which is connected by the conductor 83 to the magnet 39 which when energized will actuate the switch arm 38 to engage the contact 17.

This energization of the magnets 33, 36 and 39 by depressing the keys 67, 68 and 69, respectively, will only occur when the keys are depressed in the succession named. The means whereby this succession will determine the energization of the magnets 33, 36 and 39 which control the magnet 10 of the stock area selected will now be described. If the key 67 is the first key of a group of three to be pressed, it will, as aforesaid, cause the magnets 41 and 33 to be energized. The magnet 41, see Fig. 2, is connected by the conductor 84 to the magnet 85, which in turn is connected by the conductor 86 to the contact or brush 87, which in Fig. 2 engages the contact 88 on the drum 89. From the contact 88 the current will pass when the brush 87 engages the same to the slip ring 90 which is in engagement with the contact 91, which in turn is connected by the conductor 92 to the conductor 19. The key 67, however, is connected by the conductor 159 to the common conductor 95, common to all of the keys in the keyboard 9 and connected not only to the key 67, but also to the keys 68 and 69 so that when the key 67 is depressed, the current will pass through the conductor 19 through the magnet 94 to energize the same, thereby to attract the switch arm 195 to engage the contact 96 to energize the magnet 97. This magnet, see also Fig. 8, when energized will attract the arm 98 against the tension of the spring 99 to withdraw the pawl 100 out of engagement with the ratchet wheel 101 on the drum 89. Immediately after the key 67 has been released, the current through the magnet 94 will be interrupted thereby to liberate the switch arm 195 and in turn interrupt the current to the magnet 97, whereupon the spring 99 will actuate the arm 98 and pawl 100 to cooperate with the ratchet wheel 101 to rotate the drum 89 one tooth space so that thereupon the contact 87 will leave the contact 88 and the second contact 102 will engage the contact 103 on the drum. When the contact 102 so engages the contact 103 it will be in position upon the depression of the next succeeding key, the key 68 in the present instance, to energize the magnet 58, the contact 102 being connected by the conductor 104 to the magnet 105 which in turn is connected to the conductor 106 which is connected by the conductor 107 to the solenoid 58.

In turn, when the key 68 will so be depressed, the current to the magnet 94 will be re-established, in turn, as aforesaid, to close the circuit to the magnet 97 and again actuate the arm 98 and with it the pawl 100 to liberate the ratchet wheel 101 and position the pawl for engagement with the next succeeding tooth of the ratchet wheel 101 so that upon release of the key 68 and the deenergization of the magnets 94 and 97, the spring 99 will again actuate the arm 98 and pawl 100 to rotate the ratchet wheel 101 a second tooth space and now bring the contact 108 into engagement with the contact 109. The contact 108 is connected by the conductor 110 with the magnet 111, which in turn is connected to the conductor 112 which is connected by the conductor 113 with the magnet 75. Consequently, upon the depression at this time of the key 69, the magnets 94 and 97 will again be energized to attract the arm 98 and pawl 100 to release the ratchet wheel 101 and position the pawl 100 for engaging the next tooth of the ratchet wheel 101 to actuate the same and therewith the drum 89 to position a fourth contact on the drum 89 in contact relation with the contact 87, for the selection of the next stock area when the key 69 is released.

From the foregoing, it will thus be seen that with the successive engagements of the keys 67, 68 and 69, the magnets 41, 58 and 75 will be initially energized. The energization of these magnets 41, 58 and 75 will initially actuate the switch arms 42, 59 and 76 to energize the magnets 114, 115 and 116, respectively, when the switch arms 117, 118 and 119 will be actuated to engage the contacts 120, 121 and 122, respectively. As a result thereof, the conductor 44, associated with the key 67, the conductor 61 associated with the key 68, and the conductor 78 associated with the key 69 will be connected to the intermediate conductor 123 and by it to the conductor 29, which conductor 29 is connected by the conductors 124 and 128 with the contact 125, and by the switch arm 126 to the contact 127 of the conductor 228 which is connected to the switch arm 129 normally in contact with the contact 130 of the conductor 131 which is connected to the winding 28 of the transformer 23, and from the transformer 23 through the contact 22, switch arm 21 to the conductor 19, and from the conductor 19 by way of the conductor 145, magnet 146, contact 147, arm 148, conductor 149, to the magnet 33, and from the magnet 33 back to the magnet 114 by the conductor 44, and similarly from the conductor 19 by way of the conductor 140 to the magnet 141, contact 142, switch arm 143, conductor 144, to the magnet 36, and then back by way of the conductor 61 to the magnet 115, and in turn from the conductor 19 by way of the conductor 132 to the magnet 133, then to the contact 136, switch arm 137 and conductor 139 to the magnet 39, and back to the magnet 116 by way of the conductor 78.

In this arrangement, the magnets 114, 115 and 116 will serve in part as holding relays for the switch arms 117, 118 and 119, respectively, and similarly the magnets 133, 141 and 146 will serve in part as holding relays for the switch arms 137, 143 and 148, respectively. The magnets 146, 141 and 133 will be initially energized to attract the switch arms 148, 143 and 137, respectively, when the magnets 85, 105 and 111 will be initially energized by the successive depressions of the keys 67, 68 and 69, respectively, to attract the switch arms 150, 151 and 152 into engagement with the contacts 153, 154 and 155, respectively.

The circuits for the magnets 41, 58 and 75 will be substantially as follows: for the magnet 41, the common conductor 95 from the keys 67, 68 and 69 will pass through the magnet 94, conductors 93, 29, 124, conductor 128, contact 125, switch arm 126, contact 127, and conductor 228 to the conductor 131, and finally to the transformer 23, and then from the transformer 23 by means of the conductor 19 to the conductor 92, slip ring 90, contact 87, conductor 86, magnet 85, and conductor 84 to the magnet 41 which is connected by the conductor 40 to the key 67 when depressed.

For the magnet 58, when the key 68 is depressed, the current will pass through the common conductor 95, magnet 94, conductors 29, 124, and conductor 128 back to the transformer 23, and from the transformer 23 by means of the conductor 19, conductor 92, slip ring 90, contact 102, conductor 104 and conductor 106, to the magnet 58, and from the magnet 58 by means of the conductor 56 to the key 68 when depressed.

In turn, the current for the magnet 75 when the key 69 is depressed will pass from the common conductor 95 to the conductors 93, 29, 124 and 128 to the transformer 23, and from the transformer 23 by means of the conductor 19 to the conductor 92, slip ring 90, contact 108, conductor 110, to the magnet 75, and from the magnet 75 by means of the conductor 73 back to the key 69 when depressed. The magnets 41, 58 and 75 will, of course, only be energized when the contacts 87, 103 and 108 register with their particular contact plates 88, 102 and 109, respectively, on the drum 89 as heretofore described.

The circuits for energizing the magnets 114, 115 and 116 and thus for maintaining the switch arms 30, 35 and 38 in closed position until the new quotation has been posted is substantially as follows: for the magnet 114, the current will pass from the conductor 123 to the positive conductor 29, conductors 124 and 128, contact 125, arm 126, contact 127, conductor 228, arm 129, contact 130, and conductor 131 to the transformer 23, and from the transformer 23 through the conductors 19 and 145, magnet 146, conductor 149, magnet 33 and conductors 49 and 44 back to magnet 114. In turn, for the magnet 115, the current will pass from the conductor 123 to the positive conductor 29, conductors 124 and 128, contact 125, arm 126, contact 127, conductor 228, arm 129, contact 130 and conductor 131 to the transformer 23, and from the transformer 23 through the conductors 19 and 140, magnet 141, conductor 144, magnet 36 and conductor 61 back to magnet 115.

In turn, for the magnet 116, the current will pass from the conductor 123 to the positive conductor 29, conductors 124 and 128 to the transformer 23 and from the transformer 23 through the conductors 19 and 132, magnet 133 and conductor 139 to the magnet 39 and through the conductor 78 back to the magnet 116.

*Mechanism for setting "last" quotation*

Since the mechanism for setting the "last" quotation will be operated with each new quotation differing from a previous one, whether higher or lower, such mechanism may be divorced from the mechanism for operating the "open," "high" and "low" quotation reporting wheels and be operated for posting a single item whether stock quotation, the successive reports of a political election, the successive reports of the total sums wagered for a race, or the successive reports of the odds established by the amounts wagered as is conventional with parimutuel machines.

In the present instance, the "last" quotation wheels 162, 163, 164 and 165 are each provided with a radially extending web 166. At the inner end of the web 166, the wheel 162 is provided with an axially extending hub 167 mounted on the shaft 168 and fixed thereto, which wheel, in case of a stock quotation machine, will preferably constitute the eighths wheel. The shaft 168 is preferably journalled at its ends in the supporting plates 169 and 170. At the periphery of the web 166 of the wheel 162, there is provided an axially extending cylindrical shell 171, the outer periphery or face of which is divided into ten successive equal areas including a black colored area, an area for each of the numerals 1 to 7, inclusive, a blank area, and a white colored area, each of the areas being equal in length as aforesaid, so that the arcuate or circular length of the outer periphery of the shell 171 will be divided into ten equally sized adjacent areas. The black colored area when displayed will indicate that there is no fraction in the price quoted, each of the numerals from 1 to 7, inclusive, when displayed, will indicate the fraction in eighths; the blank area will never be displayed; and the white area when displayed will indicate at the opening of a trading period that no quotations have been posted for that trading period.

Each web 166, see Fig. 5, is provided with two contact or slip rings 172 and 173, the ring 173 being endless and connected by the bridge 174 with one end 175 of the ring 172 interrupted from its other end. The ring 172 is furthermore composed either of carbon, a winding or other resistant means, so that the electric resistance included or exercised will decrease as the brush 176 recedes in a counter-clockwise direction from the end 175 of the ring 172. The brush 176, see Figs. 1 and 5, is connected by the conductor 177 to the conductor 178. The brush 179 in engagement with the ring 173, on the other hand, is connected by the conductor 180 to the contact 181. In other words, as the wheel 162 is rotated clockwise, the brush 176 will include in the circuit a decreasing extent or portion of the resistance ring 172.

The hub 167 of the wheel 162, see Fig. 1, is pinned to the shaft 168 by the pin 182. On the shaft 168 there is also pinned the hub 183 of the ratchet wheel 184, cooperating with the spring pressed pawl 185 pivotally mounted on the escapement wheel 186, rotatably mounted on the shaft 168, the teeth of which wheel 186 are operatively associated with the fingers 187 and 188 of the bifurcated claw 189 pivotally mounted on the shaft 190 journalled in the supporting plate 169 and having an armature 191 operatively associated with the magnet 192 which is connected by the conductor 193 to the switch arm 11, and by the conductor 194 to the make and break device 295 which in turn is connected by the conductor 196 to the contact 197, and the conductor 196 in turn is also connected by the conductor 198 to the switch arm 199 to be brought into engagement with the contact 200 when the magnet 201 is energized. In the present instance, the magnet 192 when energized will actuate the armature 191 to rotate the wheel 162 in a counter-clockwise direction; that is, to cause the display wheel 162 to display a greater number as it rotates, so that if it had displayed the black area equivalent to zero, indicating that there is no fraction in the quotation being displayed, the next area to be displayed will be the "1" area indicating that the quotation then being displayed contains or includes the fraction "1/8."

The shaft 168, see the left hand end of Fig. 1, has also fixed thereon the hub 202 of the ratchet wheel 203 operatively associated by a pawl to the escapement wheel 204 rotatably mounted on the shaft 168 which wheel 204 is operatively associated with the claw 205 pivotally mounted on the shaft 206, journalled in the supporting plate 170. The teeth of wheel 204 are opposite hand to those of wheel 186. The claw 205 will be actuated when the magnet 207 is energized, such actuation by the magnet 207 will actuate the shaft 168 in the opposite direction to the direction of rotation when actuated by the claw 189; that is, in a clockwise direction when looking at Fig. 5, instead of counterclockwise; and therefore cause the wheel 162 when rotated to display smaller numbers to indicate that the price is falling. This magnet 207 is connected by the conductor 208 to the conductor 193 and by the conductor 209 to the contact 210. This conductor 209 is also connected by the conductor 211 to the contact 212 which is engaged by the switch arm 213 when the magnet 214 is energized. As will hereinafter appear, when the quotation being registered is lower than one theretofore posted, a circuit will be established to energize the magnet 214 to bring the switch arm 213 into engagement with the contact 212 and in turn, when the quotation being registered is higher than the one theretofore posted, the circuit will be established which will energize the magnet 201 instead of the magnet 204. In other words, either the magnet 201 or the magnet 214 will be energized depending upon whether the quotation being registered is higher or lower than the one already posted. The wheels 163, 164 and 165 are rotatably mounted on the shaft 168 adjacent to the wheel 162, the wheels 163, 164 and 165 cooperating with the wheel 162 to post any single quotation, the units, tens and hundreds of a given number, respectively. As distinguished from the wheel 162 which is fixed to the shaft 168, the wheels 163, 164 and 165 are rotatably mounted on the shaft 168 but connected to the wheel 162 by the gears 215, 216 and 217, rotatably mounted on the shaft 218 which is connected at its ends to the supporting plates 169 and 170. The shaft 218 may be fixed in its relation to the supporting plates 169 and 170, since the gears 215, 216 and 217 will rotate independent of one another and only be actuated when, as is conventional, either the next number to be posted is a whole number as distinguished from a fraction previously posted by the wheel 162 when the wheel 162 will actuate the gear 218 in turn to actuate the wheel 163 to display the next whole number as compared to the zero or last whole number displayed by the wheel 163. In turn, when the next number to be posted is "10" or a multiple thereof as distinguished from "9," the last number displayed by the wheel 163, then the gear 216 will be actuated in turn to actuate the wheel 164 and display the next whole number, and similarly the gear 217 will be actuated by the wheel 164 to actuate the wheel 165 when the next number is 100 or a multiple thereof as distinguished from the previously posted number which was lower by one whole number or "⅛" as compared to the new number "100" or a multiple thereof. Since the structure of the gears 215, 216 and 217 is identical and is well known in the accounting machine art, it is believed sufficient to describe the gear 215 with respect to the wheels 162 and 163, Figs. 1 and 5. Each of the wheels 162 to 165, inclusive, is provided with a single notch 219 to receive one of the four teeth 220 of the gear 215, 216 or 217. Adjacent to the teeth 220 there are provided in the present instance eight teeth 221 which mesh with the teeth 222 on the peripheral edge of the wheel 163 adjacent to the wheel 162. The free end of the wheel 162 is of course not provided with any teeth, such as the teeth 222, and in turn the wheel 165 of course is not provided with any teeth or recess such as the recess 219 of the wheel 162. With this arrangement with every complete rotation of the wheel 162, the rear 215 is rotated one tooth space by the cooperation of the notch 219 with one of the teeth 220 of the gear 215 and at the same time the next adjacent wheel, the wheel 163, in the present instance, is advanced or actuated one area space corresponding to the area of a number on the outer face of the shell 171 of the wheel 163, due to the cooperation of the teeth 221 with the teeth 222 of the wheel 163. In turn, in a similar way with every complete rotation of the wheel 163, the gear 216 will be actuated in turn to actuate the wheel 164 a single area distance, and in turn for every complete rotation of the wheel 164 the gear 217 will in turn actuate the wheel 165 one area space or distance. Obviously, if the prices are dropping and the new quotation is lower than the last quotation, then instead of actuating the successive wheels 163, 164 and 165 to post a higher quotation, it will post a lower quotation with the rotation of the wheel 162 to post a lower number.

Each of the wheels 163, 164 and 165 also have on the outer faces of their shells 171, a plurality of display areas, in this instance ten display areas, each including a successive number or index from "0" to "9," inclusive, and in the same order as the indices on the shell 171 of the wheel 162.

From the foregoing, it will appear that the wheels 163, 164 and 165 will be rotated, if at all, in the same direction as the rotation of the wheel 162 according to the direction of rotation of the shaft 168 to which the wheel 162 is pinned, and that the claw 189 associated with the magnet 192 will actuate the shaft 168 to cause the wheels to advance, that is, to post higher numbers than those theretofore posted, and that when the shaft 168 is actuated by the claw 205 associated with the magnet 207, the wheels will rotate in the opposite direction and thereupon post numbers or quotations lower than those therefore posted.

Before the wheels 162 to 165, inclusive, can be actuated to post a new quotation, as aforesaid, the stock area must be selected and when it is selected it will initially energize the magnet 10, in turn to actuate the switch arms 11 and 12 into engagement with the contacts 13 and 14, respectively, when the conductor 193 connected to the magnets 192 and 207 will be connected to the main negative lead 25 by means of the conductor 160. Whether the positive lead 27 is connected to the magnet 192 or 207 will depend upon whether the magnet 201 or 214, respectively, are energized. If the magnet 201 is energized, then the current will pass from the magnet 192 through the conductor 194, make and break device 295, conductor 196, conductor 198, switch arm 199, contact 200, conductor 247, switch arm 246, contact 245, switch arm 244 and conductor 26 to the high voltage positive main lead 27, the magnet 156 or starting switch having theretofore, as aforesaid, been energized and brought the switch arm 244 into engagement with the contact 245. In turn, if the magnet 214 is energized, then the current will pass from the magnet 207 through its associated make and break device 395 to conductors 209, 211, contact 212, switch arm 213 and conductor 247, as aforesaid, by way of switch arms 246 and 244 and conductor 26, back to the high voltage positive main lead 27.

Assume for instance that the last quotation posted is lower than the quotation being posted when the magnet 201 is initially energized in turn to establish the circuit for the magnet 192. This will be accomplished by the means now to be described. In Fig. 4, in the right hand column, there are shown a plurality of keys, the key 223 causing the wheel 162 to display the black area on the shell 171, and the keys 224 to cause the areas 1 to 7, inclusive, on the wheel 162 to be displayed, key 465 for the blank area on the wheel 162, and the key 225 when depressed to cause the white area on the wheel 162 to be displayed. For each of the wheels 163, 164 and 165 in turn, according to the area to be displayed, corresponding in the indices "0," "1" to "9," inclusive, the keys 226 are required to be depressed. Now assuming that the last number posted by the wheels 165 to 162, inclusive, was "110.0," then the wheel 165 would display the area containing the number "1," the wheel 164 would display the area containing the number "1," the wheel 163 would display the area containing the index "0," and the wheel 162 would display the area containing the black spot. If the number now being posted is "110⅛," then the attendant would be required to depress the key 224 corresponding to the area containing the number "1" on the wheel 162. Thereupon, the conductors 227 and 229 would be bridged as a result of which the magnet 230 would be energized to actuate the two arms 231 and 232 into engagement with the contacts 233 and 234, respectively, whereupon the current will initially pass from the positive lead 28 connected to the transformer 23 through the conductor 129 to the conductors 240, 227 and resistance bar 250 and then through the conductor 251, magnet 252 to actuate the two switch arms 253 and 254 to separate the switch arm 253 from the contact 131 and to bring the switch arm 254 into engagement with the contact 256. From the magnet 252 the current will continue through the conductor 257 to the magnet 258 and from the magnet 258 through the conductors 259 and 260 to the negative lead 19 back to the transformer 23. At the same time the magnet 258 will be energized to attract the switch arm 261 if it can overcome the attraction of the magnet 262 for the switch arm 261. This circuit will be established only momentarily.

Before the key 224 has been so depressed, however, and immediately that the magnet 19 is energized upon the selection of a stock area, all of the resistances in the wheels 162 to 165 will be electrically connected to the transformer 23. The contact 179 of the wheel 162, as an instance, will be connected by the conductor 180, through the contact 181, switch arm 253, conductor 264, and magnets 265 to the conductors 124, 128, 228 and 131 to the positive lead 28 of the transformer 23 and from the contact 176 to the conductor 177, common conductor 178 to the contact 14, switch arm 12 and conductor 19 back to the negative lead of the transformer 23. In turn, the contact 266 of the wheel 163, contact 267 of the wheel 164 and contact 268 of the wheel 165 will be connected to the common conductor 178 and by way of the contact 14 and switch arm 12 back to the negative lead 19 of the transformer 23.

While the contact 269 of the wheel 163 will be connected by the conductor 270 to the switch arm 271, conductor 272 and magnets 273 of the units column to the conductor 124 and from it by way of the conductors 128, 228 and 131 to the positive lead of the transformer 23, in addition the contact 274 of the wheel 164 will be connected by the conductor 275 to the switch arm 276 and then by the conductor 277 from the magnets 278 of the tens column to the return conductors 124, 128, 228 and 131 to the positive lead of the transformer 23. In addition, the contact 279 will be connected by the conductor 280 to the switch arm 281 and by the conductor 282 to the magnets 283 of the hundreds column and then to the return conductors 124, 128, 228 and 131 back to the positive lead of the transformer 23.

If, as aforesaid, the number last posted was "110.0," indicating that the number was a whole number and the eighths column displayed a black spot, the wheel 165 would display the numeral "1," the wheel 164 the numeral "1," the wheel 163 the index "0" and the wheel 162 the black spot. In this case in the hundreds column the magnet 283 corresponding to the key "1" would be energized to actuate a switch arm 284 into engagement with the contact 285, whereupon, in addition the magnet 286 would be energized to bring the switch arm 287 into engagement with the contact 288. In addition to the magnet 283, all of the magnets 283 in the hundreds column would be energized, but only the switch arms 284 corresponding to the number "1" key and corresponding to the "0" index would be energized for the reason now to be explained.

Each of the switch arms 284 is maintained in depressed position by a spring 289. The springs 289, associated with the switch arms 284, are graduated in pulling force so that, as an instance, the lowermost spring has a pulling force approximating one-fourth of an ounce, the next uppermost spring 289 a pulling force of one-half an ounce, and so on, with a one-fourth ounce increase for each successive adjacent upper switch, with the uppermost switch having a pulling force of two and one-half ounces. The pulling forces of these springs 289 are so determined to approach but not exceed the electromotive force, or pulling force, exercised when the contact 176 engages the ten successive areas on the slip ring 172. In other words, the greatest amount of resistance in the slip ring 172 connected to the contact 176 will correspond to the lowest electromotive force or pull exceeding the pulling force of the lowermost spring 289 corresponding to the "0" key, but not strong enough to overcome the pulling force of the spring 289 connected to the switch arm 284 corresponding to the key "1." In other words, if the number "1" is displayed on the hundreds wheel 165, the contact 268 will engage the slip ring 290 where it will energize all of the magnets 283 and pass sufficient current to overcome the two lowermost springs 289 to permit the two lowermost switch arms 284 to be swung upwardly into engagement with the contacts 285. This current, however, will not be sufficient to overcome the resistance of any springs 289 above the two lowermost, so that only the two lowermost arms 284 will have been swung upwardly into contact with their adjacent contacts 285. As a result thereof, a current will pass from the transformer 23 through the negative conductor 19 to the conductor 291, to the uppermost switch arm 284, the intermediate conductor 292, down to the next switch arm 284 and back to the intermediate conductor 292 and so on, until the conductor 293 is reached when the current will pass through the magnet 286 corresponding to the key "1," then over to the contact 285, switch arm 284 and conductor 294, back to the conductors 124, 128, 228 and 131, back to the positive lead of the transformer 23. It will be seen that the only magnet 286 in the hundreds column which has been energized is the one corresponding to the number "1" key. Consequently, it will actuate the switch arm 287 into engagement with its contact 288 and remain in such engagement until the magnet 595 has been energized to attract the arm 296 into engagement with the contact 297 when a current will be established from the negative side of the transformer 23 through the conductor 239 to the conductor 298, magnet 299, conductor 300, across the switch arms 296, 297 to the conductor 301 and then back by way of the conductors 124, 128, 228, 131 and positive lead of the transformer 23. If a key 226 in the hundreds column had been depressed and it corresponded to the number already posted in the hundreds column, assumed to be number "1," then the magnet 283 initially and the magnet 286 subsequently in the same level as that of the key 226 for the number "1" would be energized to attract its associated switch arm 287 due to the current selected by the brush 268 relative to the slip ring 290, and in turn the magnet 230 and subsequently the magnet 595 would be energized to attract its associated switch arm 296, whereby current could then pass from the negative lead of the transformer 23 through the conductor 298 to the magnet 299, conductor 300, switch arms 296 and 297 to conductor 301 and then by the positive return 124, 128, 228 and 131 back to the transformer 23. When the magnet 299 was so energized, the switch arms 302 and 303 would be actuated, the switch arm 302 would leave the contact 304 and the switch arm 303 would engage the contact 305. If key 226 in the hundreds column was not depressed, and similarly no keys were actuated in the tens and units column, the magnets 299, 306 and 307 would remain neutral and the current from the negative conductor 19 would pass through the conductor 308, switch arm 302, conductor 310, switch arm 311, conductor 312, switch arm 313 and conductor 314, but not pass any further until the last stop magnet 315 was energized. If, on the other hand, a key 226 were depressed in each of the hundreds, tens and units columns, corresponding to the number in such columns previously posted, and then the magnets 299, 306 and 307 would be energized, directing the current from the negative lead 19, through the conductor 308, switch arm 303, conductor 316, switch arm 317, conductor 318, switch arm 319 and conductor 314 where again it would not pass any farther until the magnet 315 were energized. There would, of course, be no purpose in selecting a stock, and selecting the identical quotation equal to the last quotation posted, and therefore there would be no occasion for depressing the key 224 in the eighths column corresponding to the eighths index last posted. Assume, however, the case given, as aforesaid, namely that the last quotation was "110." for Anaconda with the black spot posted in the eighths column to indicate that the price did not include a fraction, and the next price to be posted was "110⅛." Then it would only be necessary to depress the key 224 in the eighths column with or without previously having depressed the keys 226 in the hundreds, tens and units column.

When the key 224 in the eighths column is thus depressed to post the price "110⅛" after the last previous price posted was "110." with a black spot displayed in the eighths column, at least three distinct functions will be performed, to wit: the first function characterized by energizing either the magnet 201 for controlling the rising price operating magnet 192, or the magnet 214 for controlling the descending price operating magnet 207; the second function characterized by energizing the magnet 156 serving as the starting switch to permit the high voltage current to flow either to the rising price operating magnet 192 or the descending price operating magnet 207; and the third function characterized by energizing the magnet 315 or last stop switch, thereby to close a circuit to the magnet 320 of the delayed relay 321, which magnet 320 when energized would eventually actuate the switch arms 129 and 246 to interrupt the current for controlling the magnets of the stock selector elements illustrated in Fig. 2, as well as the current to the magnet 10 and the number selecting elements, illustrated in part in Figs. 1, 3 and 4.

The first function is concerned with selecting either the rising price operating magnet 192 or the descending price operating magnet 207. Since it is assumed here that the new price will be a higher price, to wit "110⅛" instead of the whole number "110.," we shall expect to ultimately select the magnet 192. Immediately that the magnet 10 is energized after the stock has been selected by the keyboard 9, the switch arms 11 and 12 will be attracted to close the circuits to the several magnets 283, 278, 273 and 265, illustrated in Fig. 4, which are associated with the price posted by the wheels 165, 164, 163 and 162 respectively. Thereupon, when the key 224 in the eighths column alone is depressed, for posting the "1" indicating the fraction "⅛," the current will initially pass from the positive lead associated with the transformer 23, through the conductor 128, key 224, conductor 227 and resistance bar 250 to the conductor 251, magnet 252, conductor 257, magnet 258, conductor 259 and back to the transformer 23 by way of the negative conductor 19. In this way at the same time the magnet 252 will actuate the switch arms 253 and 254 so that the switch arm 253 will leave the contact 181 and the switch arm 254 will engage the contact 256. Thereupon the current will now also pass through the magnet 262 in opposition to the magnet 258, and the current for the magnet 262 will pass from the transformer 23 by way of the conductor 19 to the switch arm 12, contact 14 and by way of the conductors 322, 178, 177 and 180, switch arm 254, conductor 323, magnet 262 to the positive conductor 324, and back to the transformer 23. Consequently, since there will be a greater electromotive force passing through the magnet 258 than through the magnet 262, the switch arm 261 will be attracted and brought into engagement with the contact 325, as a result of which the magnet 326 will be energized and the current now flows from the negative lead 19, through the magnet 326, switch arm 327, conductor 328, magnet 329, conductor 330, magnet 331, conductor 324, through magnet 201 back to the transformer 23. When the magnet 201 is so energized, it will swing the switch arm 199 into engagement with the contact 200 to ready the magnet 192 for actuation immediately that the magnet 156 is energized, the current then passing from the negative high voltage main lead 25, conductor 160, switch arm 11, conductor 193, magnet 192, conductor 194, make and break device 295, conductor 196, switch arm 199 to positive conductor 247, down to switch arm 246 and contact 245. Thereupon, immediately that the magnet 156 is energized to swing the switch arm 246 into engagement with the contact 245, the current will then pass on from the contact 245, through the switch arm 246 and conductor 26 back to the high voltage positive lead 27.

In case however the current passing through the magnet 262 indicating that the new price was a lower price would be greater than the current passing through the magnet 258, then the arm 261 would be attracted to the contact 346 as a result of which the current from the negative lead 19 associated with the transformer 23 would pass down through the conductor 260, arm 261, contact 346, magnet 347 to energize the same and cause the arms 348 and 327 to be attracted, the arm 327 out of engagement with its contact and the arm 348 into engagement with the contact 349. The current would then pass through the conductor 350, arm 351, conductor 352 to magnet 353, conductor 354 to magnet 214 energizing the same to swing the switch arm 213 into engagement with the contact 212 and also to actuate the switch arm 355 into engagement with the contact 356. From the magnet 214 the current for the same would be established through the conductor 357 back to the positive lead 358 of the transformer 23. In this way, the current to the magnet 201 which establishes the current to attract the arm 199 will be interrupted immediately that the key 224 is released, and consequently no current flow to the magnet 192 for actuating the advancing escapement claw 189, and on the other hand, the magnet 214 energized to establish the circuit to the magnet 207 for actuating the descending escapement claw 205. The high voltage current for the magnet 207 then will pass from the negative lead 150, contact 13, switch arm 11, conductor 206, magnet 207, make and break control 395, conductors 209, 211, switch arm 213, and conductor 247, contact 341, switch arms 246, 244 and conductor 26 back to the negative high tension lead 27.

The moment the key 224 is released, the magnet 252 will, of course, be released to enable the switch arms 253 and 254 to return to normal whereby the switch arm 254 will clear the contact 256. In this way, the current to the magnets 262 and 258 will be interrupted. In the meantime, however, if the magnet 258 could overcome the attraction of the magnet 262 and attract the arm 261, the magnet 326 will have been energized to actuate the switch arms 359 and 351, the switch arm 359 to engage the contact 360 and the switch arm 351 to leave its contact and interrupt the current to the conductor 352. When the switch arm 359 so engages the contact 360, the magnet 326 will serve as a holding relay and permit the current then to pass to the conductor 328 from the negative conductor 19 through the conductor 361, switch arm 359, magnet 326, switch arm 327 to conductor 328. In turn, if the current in the magnet 262 was sufficient to overcome the attraction of the magnet 258, the switch arm 261 will have been brought into contact with the contact 346, in turn to energize the magnet 347 to bring the switch arm 348 into engagement with the contact 349 and then serve as a holding relay when the magnet 262 is deenergized, permitting the current then to pass from the negative lead 19 through the conductor 362, switch arm 348, magnet 347, conductor 350, switch arm 351 and conductor 352 to the magnet 353, conductor 354 and magnet 214.

The magnet 156 heretofore referred to will be energized as part of the second function now to be described. While the key 224 is depressed it will, as aforesaid, close the circuit to the magnet 230 thereby actuating the two switch arms 231 and 232 which will serve as a holding relay to maintain the switch arms 231 and 232 in engagement with their respective contacts 233 and 234 when the key 224 is released. When the key is so released, the current will then pass from the negative lead 19 associated with the transformer 23, through the conductor 243, magnet 156, conductor 242, switch arm 232, conductors 241 and 240, back to conductor 128 which is connected by conductors 239 and 131 to the positive lead of the transformer. In this way, upon the release of the key 224, the magnet 156 constituting the starting switch will attract the switch arm 244 and thereby close the circuit as aforesaid from the contact 245 to the main positive high voltage lead 27 through the switch arm 244 and conductor 26.

The third function characterized by energizing the last stop switch 315 will not take place until after the magnet 192 will have been energized in turn to actuate the claw 189 to advance the wheel 162 one character space from displaying the black spot to displaying the number "1." Thereupon the contact 176 will have advanced on the slip ring 172 to reduce the resistance equivalent to one space and thereby increase the current sufficiently now to energize the magnet 331 in the same level with the number "1" key of the eighths column. It is here understood, of course, that immediately that the key 224 associated with the number "1" key was released, the current from the resistance bar 250 through the magnet 252 was interrupted to enable the switch arms 253 and 254 to return to normal position, that is, where the switch arm 254 again leaves the contact 256 and the switch arm 253 now again engages the contact 131 as a result of which, after the key 224 has been so released, the circuit, including the slip rings 173 and 172 of the fraction wheel 162, will again be associated with the magnet 331 by the conductor 264. When this occurs, the magnet 331 will attract the arm 332, thereby to bring the switch arm 332 into engagement with the contact 333, thereby to establish a circuit through the magnet 334 to attract the switch arm 335. Since the release of the key 242 will establish a circuit through the magnet 237 to attract the switch arm 336, a current will now be completed from the negative lead 19, through the conductor 239, magnet 315, conductor 337, switch arms 336 and 335, conductor 338 to conductor 128 and by it through the conductors 223 and 131, back to the positive lead of the transformer 23. Immediately that the magnet 315 is so energized, it will actuate the switch arm 339 into engagement with the contact 340, thereby establishing the circuit through the magnet 320 to actuate the same and initiate the actuation of the time delayed relay 321, to actuate the switch arms 129 and 246 to leave the contacts 130 and 341 and to keep the circuit interrupted for a length of time, say plus or minus one-tenth of a second, long enough for the various switch arms which have been displaced to record the new quotation, to return to their original positions. The current for the magnet 320 through the switch arm 339 can be traced from the positive lead of the transformer 23, through the conductor 131 to the magnet 320 and then by means of the switch arm 339, conductors 314, 312, 310 and 308 back to the negative lead 19 of the transformer 23.

*Mechanism for setting either "high" or "low" quotation*

In the present instance there is, see Fig. 3, a hundreds, tens, units and eighths column of magnets similar to the columns of magnets illustrated in Fig. 3 according to the present invention, associated to actuate either the high clutch magnet 342 or the low clutch magnet 343 to effect the actuation of the wheels 344 or the wheels 345, respectively, for displaying the high or low quotations.

Still assuming the example set forth heretofore when the number last posted was the whole number "110" with a black spot in the fraction area to indicate that there were no fractions and that the new number being posted was the number or price "110⅛" with the "1" being displayed in the fraction area, then the new price would, of course, be a higher price. According to the present invention, in such an eventuality, the magnet 342 controlling the arm 363, Fig. 1, would be energized and then only if the "last" quotation or price appearing on the wheels 344 was lower than the new price to be posted. Assume now that the last price posted on the wheels 344 was the whole number "110" with the black spot in the fraction area to indicate that no fractions appeared in the price, then if the up escapement magnet 207 were energized the wheels 344 as well as the wheels 162 to 165, inclusive, would rotate with the shaft 168 until a new price, "110⅛," were posted on both the wheels 162 to 165, inclusive, and the wheels 344.

The control of the magnet 342 would result in the manner now to be described. In order to bring about this relationship, it will appear that initially when the up escapement magnet 207 is energized, indicating that the control magnet 258 was sufficient to overcome the magnet 262 and attract the arm 261, then the current would pass from the transformer 23 through the conductors 358, 324, magnet 331, conductor 330 and magnet 329 thereby energizing the magnet 329 to actuate the switch arms 369, 370, 371 and 372 to engage their respective contacts associated with the conductors 373, 374, 375 and 376, respectively, leading to the inner slip rings of the wheels 344 similar to the slip ring 173 of the wheel 162, the outer slip ring being connected by the conductors 377, 378, 379 and 380 which are connected to the common conductor 178 and thereby connected to the negative main lead 19 back to the transformer 23. In this way if a higher price is next to be displayed or posted, the wheels 344 will be connected to the four rows of magnets corresponding to the hundreds, tens, units and eighths columns illustrated in Fig. 3.

In the first place, the magnets 381 of the hundreds column, the magnets 382 of the tens column, the magnets 383 of the units column, and the magnets 384 of the eighths column will be energized, the current passing from the negative lead 19 through the wheels 344 and through the conductors 373 to 376, inclusive, to the magnets 381, 382, 383 and 384, respectively, and from these magnets back through the conductor 124 to the positive side of the transformer 23. When these magnets 381 to 384, inclusive, are so energized, depending upon the current determined by the resistances in the outer slip rings of the wheels 344, only those switch arms 385 in the hundreds column, 386 in the tens column, 387 in the units column, and 388 in the eighths column, corresponding to the number "110" and a black spot will be actuated where the current is sufficient to overcome the reaction of the springs 389, 390, 391 and 392, respectively. These springs are also graded as was the case with the springs 289 of the arrangement illustrated in Fig. 4, that is, the spring associated with the zero or black spot area resisting a one-quarter pound pull, and each spring connected with a successive upper area corresponding to a pull about one-quarter ounce greater. In other words, the springs in the number "1" area will correspond to a one-half ounce pull, the springs in the "2" area correspond to a three-quarters ounce pull, and so on. Now if the last "high" price posted on the wheels 344 was "110" and a black spot corresponding to the "last" price posted on the wheels 162 to 165, inclusive, then the magnets 283, 278, 273 and 265 in the hundreds, tens, units and eighths columns of Fig. 4 corresponding to the same number will be energized, in turn to cause the magnets in the adjacent column, such as the magnets 334, 393 and 286 to be energized to attract their respective switch arms, such as the switch arm 335, 394 and 287 to establish a circuit from the positive lead 124 through the conductors 365, 395, 396 and 397 to their respective switch arms 366, 398, 399 and 400. Now since the energization of the magnets 381, 382, 383 and 384 in turn energized their associated magnets 401, 402, 403 and 368, the current from the positive lead 124 through the conductors 365, 395, 396 and 397 will pass up to the magnets 404, 405, 406 and 407 to actuate their respective switch arms and thereby close the current from the positive lead 247 through the switch arms 408, 409, 410 and 411 to the switch arm 412 which in the meantime has been actuated by the magnet 331 to enable the current then to pass through the conductor 413 to the magnet 342, and from the magnet 342 the current of course passes to the conductor 193 by means of the conductor 414 and from the conductor 193 back to the negative lead 160 and connected to the main high voltage negative lead 25. The positive conductor 247 so connected to the switch arms 408 to 411, inclusive, will be connected to the positive high voltage lead 27 as soon as the starting switch or magnet 156 is energized to actuate the switch arm 244 immediately that the key 224 is released.

In turn, the circuits in the hundreds, tens, units and eighths columns of Fig. 3, associated with the wheels 344 will remain established so long as the circuits in the hundreds, tens, units and eighths columns of Fig. 4 are established and immediately that the last stop switch 315 is energized, serving in turn to energize the magnet 320 and thereupon the delay unit 321, in turn to actuate the switch arms 129 and 246 to leave the contacts 130 and 341 when the circuits not only to the hundreds, tens, units and eighths columns of Fig. 3, but also those columns of Fig. 4, will be interrupted as well as the circuits to the magnets associated with the stock selector keyboard 9.

If on the other hand, the price instead of "110" with a black spot were the last price posted on the wheels 162 to 165, inclusive, were "110⅛," that is, with the numeral "1" posted in the eighths column, then if the lowest quotation posted for the day also happened to be "110⅛" and the new quotation to be posted was the whole number "110" with a black spot, when the key 224 in the eighths column was depressed corresponding to the black spot in Fig. 4, then not only would the wheels 162 to 165, inclusive, be actuated to post the new price "110" with a black spot, but also the wheels 345 associated with the low clutch magnet 343. In this case initially, the magnet 262 in Fig. 3 would overcome the force of the magnet 258 to actuate the switch arm 261 into contact with the contact 346, ultimately to energize the magnet 347 when the current would pass from the negative lead 19 through the conductor 352, magnet 353 and low escapement magnet control 214, thereby to actuate the switch arms 355 and 213 into engagement with their respective contacts 356 and 212. The current would then pass from the positive lead 247 through the switch arm 213, conductors 211 and 209 to the magnet 207 or low escapement control to actuate the claw 205, and from the magnet 207 it would return by way of the conductors 208, 193 and 160 to the negative lead 25.

Here too, when the fraction wheel 162 had finally been turned to display or post the black spot after having posted the number "1," as was the case when advancing the wheel 162, the last switch magnet 315 would be energized to interrupt the several controlling circuits. At the same time, however, now the current to the magnet 353 would be established instead of the current to the magnet 329, since the magnet 262 will in turn cause the current to be established to the magnet 343 and thereby complete the circuit through the conductor 352 to the magnet 353. When the magnet 353 is so energized, it will actuate the switch arms 415, 416, 417 and 418 to establish a current through the conductors 419, 420, 421 and 422, thereby connecting the same columns of magnets, see Fig. 3, to the wheels 345 of the "low" quotation wheels which columns were formerly connected to the "high" quotation wheels 344 when the magnet 258 overcame the force of the magnet 262, in turn to cause a current to flow through the magnet 329 instead of through the magnet 353. When the wheels 345 are so connected to the magnets 381, 382, 383 and 384, see Fig. 3, they will in turn energize the magnets 401, 402, 403 and 368, respectively, in turn to establish a current to the magnets 404 to 407, inclusive, and since now the low escapement magnet 214 is actuated, the current from the positive lead 247 will now pass through the switch arms 408, 409, 410 and 411 through the switch arm 355, conductor 423 to the conductor 424 and by it to the low clutch magnet 343 thereby to actuate the arm 425 to cause its clutch 425 to engage the fraction wheel 345 of the "low" quotation wheels 345. Here too, when the new number is finally posted by the wheels 162 to 165, inclusive, and by the wheels 345, then as was the case with the "high" quotation wheels, when associated with the "last" quotation wheels and also with the "last" quotation wheels when operating alone, upon the energization of the last stop magnet 315, there would be initiated the action through the delayed unit 321 to interrupt the several controlling currents as aforesaid.

*Mechanism for setting "open" quotation*

When this invention is to be used with a stock quotation board, then there may also be associated with the "last," "low" and "high" quotation units, an "open" quotation unit for posting the first quotation for the day. In the present instance wheels 427 are provided to post the "open" or first quotation of a trading period. These wheels are mounted on the same shaft 168 as the wheels 344, 345 and 162 to 165, inclusive.

Before the opening of a trading period, or at the end of a previous trading period, according to the present invention, it is contemplated that all of the wheels should be set to the nearest whole number on the "last" quotation wheels, and that in place of the black spot being posted or displayed on the fraction wheel, the white spot corresponding to the topmost key 225 would now be displayed to indicate to those watching the board in the new trading period that no sale had taken place for the new trading period. For this purpose it may be assumed that for the last trading period, the "last" quotation posted was "110⅞," the "low" quotation posted was "110⅝," the "high" quotation posted was "111⅛," and the open quotation posted was "110⁶/₈." In order to bring the "last" quotation up to the nearest whole number, let us assume it to be "111" with a white spot, the stock will initially be selected and the keys depressed for the numbers, see Fig. 4, to correspond to the whole number "111" and a white spot. Before the delay switch unit 321 has interrupted the circuit, the high key 428, see Fig. 3, will be brought into engagement with the contact 429 when the current will pass from the positive high voltage lead 247 through the switch arm 428, conductor 413 to the magnet 342 and from the magnet 342 through the conductors 414, 193, through switch arm 11 and conductor 160 to the high voltage negative lead 25. Thereupon the key 430 will be repeatedly pressed into engagement with the contact 210 whereby the current will be established from the positive high voltage lead 27 through the conductor 211 to the magnet 207, and such movement of the key 430 continue until the white spot will be displayed or posted in the fraction area. In turn, thereupon in order to set the "low" quotation wheels 345 at "111" with a white spot, the key 432 will be depressed into engagement with the contact 433 and then the key 430 actuated into engagement with the contact 197 to establish a circuit through the magnet 192 to raise the price posted on the "low" quotation wheels 345 from "110⁶/₈" to "111" and a white spot. Finally, in order to set the "open" quotation wheels 427, the key 434 will be depressed into engagement with the contact 435 so that the current will now energize the clutch control magnet 436 to attract the arm 437 and thereby bring the clutch 438 into engagement with the fraction wheel of the "open" quotation wheels 427 so that with the actuation of the shaft 168 now the "open" quotation wheels will be rotated. Thereupon, since the "open" quotation of the previous day was "110⁶/₈," the key 430 will now be actuated into engagement with the contact 197 until the shaft 168 has actuated the "open" quotation wheels 427 to post the quotation "111" and a white spot.

Thereupon, however, the "open" display wheels 427 will at the opening show the price "111" and a white spot for a particular stock. In order to connect the wheels 427 so that they may register the first price of a particular stock and no more, there has been provided the key 439 mounted on the shaft 168, one arm 440 of which extends through the front wall 441 of the casing, in which the wheels 427, 344, 345 and the set 162 to 165, inclusive, are mounted, the front wall having an opening or window 442, see Figs. 5 and 6, through which the numbers or indices on the peripheries of the wheels aforesaid to be displayed or posted are exposed. The handle 440 may extend through an opening 443 adjacent the window 442. This lever or key 439 has a contact 444 on the insulated portion 445 in engagement with three contacts 447, 448 and 449, the contact 447 being connected to the conductor 450 connected in turn to the "open" quotation clutch controlling magnet 436, the contact 448 being connected to the conductor 413 connected to the "high" quotation clutch controlling magnet 342, and the contact 449 being connected to the conductor 424 of the "low" quotation clutch controlling magnet 343. The key 439, furthermore, has formed thereon the tooth extension 451, in the present instance having three teeth 452, 453 and 454 to cooperate with the fingers 455 and 456 on the slidable rod 457 slidably mounted in the wall 178 and connected at one end to the arm 458 of the lever 437.

After the several sets of wheels have been set as above described, to the same whole number "111" with a white spot in the fraction area, then the key 439 may be actuated into the position shown in Fig. 7 against the tension of the spring 459. It will then be seen that where the first quotation is higher or lower than the whole number, said "111" with a white spot, due to the connection of the "open" quotation clutch control magnet 436 with both the "high" quotation clutch control magnet 342 and the "low" quotation clutch magnet 343, it will in either instance energize the "open" clutch control magnet 436 with the first setting thereby actuating the rod 457 to free the first tooth 454 and engage the second tooth 453 with finger 456 when, however, contact will still be maintained, see Fig. 7, between the plate 444, and the contacts 447, 448 and 449, as a result of which the wheels 427, 344, 345 and 162 to 165, inclusive, will be rotated with the shaft 168 either up or down to clear the white spot areas and post the first new quotation, which will be the "open," "high," "low" and "last." Upon the conclusion of its new posting, the magnet 436 will, of course, be deenergized when the rod 457 will be moved to clear the tooth 453 and then enable the contacts 447, 448 and 449 to clear the plate 444. It is, of course, understood that even if the new price being quoted is now "111" it will then appear on the "last" quotation wheels as "111" and a black spot, requiring the fraction wheel to be rotated downwardly and, of course, if the new price was any other price than the whole number "111," it would have to be lower or higher than the whole number "111" and a white spot set before the opening.

Miscellaneous mechanisms

Since the low voltage circuit can be interrupted by the key 21 adjacent the transformer 23, Fig. 4, this key can be operated manually when in the course of a posting, either the stock being selected by the keyboard 9 or the price being selected by the keys 223, 224 and 225 was incorrect. The opening of the switch arm 21 will interrupt the circuit in all of the magnets associated with the stock selecting keyboard 9 and all of the magnets associated with the price selecting keys 223, 224 and 225. After such key has been so opened, the price of course will not be posted and the selection can be started afresh.

On the other hand, if several sales at different prices of one and the same stock are to be successively posted, means are provided for holding the stock selecting magnets after a certain price has been selected, but before it has been posted, and then immediately after it is posted, to select the next price for that same stock. For this purpose, the key 458, Fig. 4, is provided to cooperate with the contacts 459 and 460 of the conductors 461 and 462, the conductor 462 being connected to the positive conductor 29 and the conductor 461 being connected to the conductor 131. The circuit for the stock selecting magnets are connected to the conductor 29 and consequently if the conductor 29 is maintained closed and not interrupted by its connection through the conductor 124 through the delayed magnet unit 321, the delayed magnet unit 321 will only open the circuit for controlling the magnets associated with the price selecting mechanism.

In turn, if while posting a quotation, the stock selecting keys were properly depressed but an error was made in selecting the number keys, then again the circuit through the conductors 29, 462 and 461 for maintaining the circuit to the stock selecting magnets will be affected by bringing the key 126 into contact with the contacts 463 and 464 when, however, the key 126 will clear the contacts 125 and 127 and thereby interrupt the current passing through the conductor 124 to the magnets associated with the keys, when the latter magnets will be liberated or deenergized, but the stock selecting magnets will be energized and the stock selection maintained.

Since the needs of a stock quotation board as here described do not require the actuation of the key 465 it may be omitted without departing from the general spirit of the invention. On the other hand, it is of course obvious that the key 465 here disclosed could also be used to advantage in posting information, other than stock quotations, where the fraction wheel might be required to be connected, as shown, to ten keys just as is the case with the hundreds, tens and units keys.

It is obvious that various changes and modifications may be made to the details of construction without departing from the general spirit of the invention as set forth in the appended claims.

I claim:

1. In an information posting board, the combination of a plurality of groups of display areas, a group of information display wheels for each area, a first control board common to all of said display areas, means for electrically connecting said first control board with any one of said display areas to the exclusion of the others thereby to select one of said areas for operation, said first control board having a plurality of keys, different electrical connections for each key, said keys and their connections in combination forming independent electromotive forces, one combination for each display area, a second control board common to all of said display areas, said second control board having a plurality of keys, means including different electrical resistances for each key to establish circuits of different electromotive forces, means including electrical resistances mounted in each wheel, brushes for stepping off different resistances for each wheel depending upon the information displayed by such wheel to establish circuits of different electromotive forces when selected by said first control board, and means for actuating the wheels of the display area selected by said first control board until their electromotive forces coincide with the electromotive forces of the circuit established by said second control board.

2. In an information posting board, the combination of a plurality of groups of display areas, a group of information display wheels for each area, a first control board common to all of said display areas, means for electrically connecting said first control board with any one of said display areas to the exclusion of the others thereby to select one of said areas for operation, said first control board having a plurality of keys, distinct electrical connections for each key, said keys and their connections in combination forming distinct circuits of electromotive forces, one combination for each display area, a second control board common to all of said display areas, said second control board having a plurality of keys, means including distinct electrical resistances for each key to establish circuits of distinct electromotive forces depending upon the keys actuated, means including electrical resistances mounted in each wheel, brushes for stepping off different resistances for each wheel depending upon the position of such wheel to establish circuits of distinct electromotive forces when selected by said first control board, and means for actuating the wheels of the display area selected by said first control board until their electromotive forces coincide with the electromotive forces of the circuit established by said second control board.

3. In an information posting board, the combination of a group of information display wheels, a control board having a plurality of keys, means including different electrical resistances for each key establishing circuits of distinct electromotive forces depending upon the keys actuated, means including electrical resistances mounted in each wheel, brushes for stepping off different resistances for each wheel depending upon the information displayed by such wheel to establish circuits of distinct electromotive forces, means for initially establishing current in the resistances of said display wheels, and means for thereupon actuating the display wheels until their electromotive forces coincide with the electromotive forces of the circuit established by the keys of said control board and after the circuit has been so established by the keys of said control board.

4. In an information posting board, the combination of a driven shaft, a group of information display wheels operatively mounted on said driven shaft, a control board having a plurality of keys, means including different electrical resistances for each key establishing circuits of distinct electromotive forces depending upon the keys actuated, means including electrical resistances mounted in each wheel, brushes for stepping off different resistances for each wheel depending upon the information displayed by such wheel to establish circuits of different electromotive forces, means including electromagnets and actuating means operatively connected to said shaft, one for actuating said shaft in one direction and the other for actuating said shaft in the opposite direction, means for initially establishing current in the resistances of said display wheels, and means for thereupon establishing a circuit by the keys of said control board to energize one or the other of said magnets to actuate said shaft and in turn said wheels until their electromotive forces coincide with the electromotive forces of the circuit selected by the keys of said control board.

5. In an information posting board, the combination of a driven shaft, four display wheels constituting a set mounted on said shaft, one wheel for the hundreds, a second for the tens, a third for the units, and a fourth for the fractions, having a cylindrical display divided into ten equal successive areas, the areas of the cylindrical displays of the hundreds, tens and units including the numerals 1 to 9, inclusive, and a marking indicative of the zero index, and the successive areas of the cylindrical display of the fraction wheel including the numerals 1 to 7, inclusive, a marking indicative of the "zero" index, a marking indicative of no previous quotation for a particular trading period, a blank area not to be displayed, said wheels being interconnected to facilitate carrying over from one wheel to the next, the fraction wheel alone being fixed to said driven shaft, a control board having a plurality of keys, means including different electrical resistances for each key establishing circuits of distinct electromotive forces depending upon the keys actuated, means including electrical resistances mounted in each wheel, brushes for stepping off the different resistances for each wheel depending upon the information displayed by such wheel to establish circuits of different electromotive forces, means including electromagnets and actuating means operatively connected to said shaft, one for actuating said shaft in one direction and the other for actuating said shaft in the opposite direction, means for initially establishing current in the resistances of said display wheels, and means for thereupon establishing a circuit by the keys of said control board to energize one or the other of said magnets to actuate said shaft and in turn said wheels until their electromotive forces coincide with the electromotive forces selected by the keys of said control board.

6. In an information posting board, the combination set forth in claim 2, characterized by means including a correction key for interrupting the circuits established by the keys of the second control board without interrupting the circuits established by the keys of the first control board.

7. In an information posting board, the combination set forth in claim 2, characterized by means including a correction key for interrupting the circuits established by the keys of both the first and second control boards before the information has been posted by these control boards.

8. In an information posting board such as set forth in claim 2, characterized by means including a holding key for maintaining the circuits set up by the first control board, and for posting a second information item by the information display wheels initially selected by said first control board.

9. In an information posting board, the combination set forth in claim 3 characterized by the display wheels including a first quotation group rotatably mounted on the driven shaft, and manually controlled means for readying said first quotation group to rotate with said shaft either to a higher or a lower price only when posting of the first quotation of a particular trading period and then enabling said first quotation group to remain dormant for the remainder of the particular trading period.

10. In an information posting board, the combination set forth in claim 1 characterized by the display wheels of each area including a first quotation group rotatably mounted on the driven shaft, and manually controlled means for readying said first quotation wheels to rotate with said shaft either to a higher or lower price only with the posting of the first quotation of a particular trading period and then enabling said first quotation wheels to remain dormant for the remainder of the particular trading period.

11. In an information posting board, the combination of a driven shaft, four display wheels constituting a set mounted on said shaft, one wheel for the hundreds, a second for the tens, a third for the units, and a fourth for indicia including the fractions, said wheels being interconnected to facilitate carrying over from one wheel to the next, the fraction wheel alone being fixed to said driven shaft, a control board having a plurality of keys, means including different electrical resistances for each key establishing circuits of distinct electromotive forces depending upon the keys actuated, means including electrical resistances mounted in each wheel, brushes for stepping off the different resistances for each wheel depending upon the information displayed by such wheel to establish circuits of different electromotive forces, means including electromagnets and actuating means operatively connected to said shaft, one for actuating said shaft in one direction and the other for actuating said shaft in the opposite direction, means for initially establishing current in the resistances of said display wheels, and means for thereupon establishing a circuit by the keys of said control board to energize one or the other of said magnets to actuate said shaft and in turn said wheels until their electromotive forces coincide with the electromotive forces selected by the keys of said control board.

WARREN THORPE.

REFERENCES CITED

The following references are of record in the file of this patent:

UNITED STATES PATENTS

| Number | Name | Date |
|---|---|---|
| 2,096,954 | Bellamy | Oct. 26, 1937 |